United States Patent [19]
Cukelj

[11] Patent Number: 5,655,858
[45] Date of Patent: Aug. 12, 1997

[54] APPARATUS FOR CONNECTING A LEFT-HANDED FEED HANDLE TO A MILLING MACHINE

[75] Inventor: Mirko Cukelj, Chesterland, Ohio

[73] Assignee: High Quality Tools, Inc., Wickliffe, Ohio

[21] Appl. No.: 619,798

[22] Filed: Mar. 20, 1996

[51] Int. Cl.$^6$ .................................................. B23Q 11/00
[52] U.S. Cl. ............................ 409/131; 74/543; 74/548; 408/135; 409/185
[58] Field of Search ........................... 409/131, 183, 409/185, 204, 206, 235; 408/1 R, 76, 135, 136, 234; 74/543, 548

[56] References Cited

U.S. PATENT DOCUMENTS

| | | | |
|---|---|---|---|
| 3,500,707 | 3/1970 | Warren | 408/76 |
| 3,605,521 | 9/1971 | Glenn | 74/548 |
| 3,821,904 | 7/1974 | Towler | 408/135 |
| 5,267,484 | 12/1993 | Cukelj | 74/543 |

FOREIGN PATENT DOCUMENTS

| | | | |
|---|---|---|---|
| 811458 | 4/1959 | United Kingdom | 408/76 |

OTHER PUBLICATIONS

High Quality Tools, Inc. "Replacement Parts & Accessories For Vertical Knee–Type Milling Machines", catalog submitted in its entirety, date unknown.

High Quality Tools, Inc. catalog of replacement parts submitted in its entirety, date unknown.

Data sheet of a Vertical Milling Machine by Bijur Lubricating Corporation, Bulletin No. 20230, date unknown.

*Primary Examiner*—Daniel W. Howell
*Attorney, Agent, or Firm*—Watts, Hoffmann, Fisher & Heinke Co.

[57] ABSTRACT

An apparatus for adapting a vertical knee-type milling machine to accommodate a handle assembly on the left side of the machine includes an elongated rotational member having a shaft portion at one end and a sleeve portion at the other end that receives a left end of a pinion shaft. The pinion shaft and the rotational member are connected to prevent relative rotation therebetween. A clutch device can move the rotational member in an axial direction of the pinion shaft to engage an overload clutch with a driven gear to rotate the pinion shaft. Connected to the rotational member is a handle engagement device for selectively engaging the rotational member with a handle assembly.

23 Claims, 3 Drawing Sheets

APPARATUS FOR CONNECTING A LEFT-HANDED FEED HANDLE TO A MILLING MACHINE

BACKGROUND ART

This invention relates to method and apparatus for connecting a left-handed feed handle to a machine such as a milling machine or a drill press.

Typical milling machines include what is known as a quill in which a tool such as an end mill or a drill, for example, is held and rotatably driven by a drive motor. The quill is vertically movable towards and away from a workpiece table.

Quill-feed speed handles allow an operator to quickly reposition the handle with respect to a quill pinion shaft. Due to the gearing between the pinion shaft and the quill, several rotations of the handle may be needed to move the quill between its extreme positions. However, during actual use, the quill is normally moved vertically only a short distance, e.g., to drill a shallow bore.

Vertical knee-type milling machines include a quill pinion shaft that extends horizontally between right and left sides of a housing of the machine. The pinion can either be rotated manually or rotated by a driven gear for moving the quill towards and away from a workpiece table. Vertical knee-type milling machines are purchased from the manufacturer having apparatus mounted only to the right end portion of the pinion shaft for mounting a handle assembly to the milling machine for providing right hand operation. Heretofore, there has not been any apparatus that would permit a handle assembly to be mounted onto the left end portion of the pinion shaft to facilitate left hand operation. At its left end portion the pinion shaft is supported by the milling machine housing and covered by a clutch arm cover. The clutch arm cover is mounted to the housing by several fasteners that extend through holes in the cover and are threaded to tapped bores in the housing.

Because vertical knee-type milling machines have not been designed with a handle assembly on the left end portion of the pinion shaft, an operator usually only moves the quill manually with his/her right hand on the right-handed handle. This presents problems for milling machine operators who also want to use their left hand on a handle to move the quill manually. Placing his/her left hand on the right-handed handle is undesirable because the operator is put into an awkward position.

In a typical milling machine the right end portion of the pinion shaft carries an overload clutch connected to the pinion shaft upon which a clutch sleeve with a geared portion is disposed. The geared portion of the clutch sleeve can engage a gear driven by a transmission in the milling machine housing. A locknut and a spring are connected to the clutch member for biasing the clutch sleeve away from the locknut in an axial direction of the pinion shaft. A trip lever is connected to a ring on the clutch member for moving the clutch sleeve in the axial direction to engage the clutch sleeve with the driven gear and thereby rotate the pinion shaft to move the quill toward or away from the workpiece. "Speed handles" are now available to replace the rigid fixed handle with which the machine is usually delivered by the manufacturer.

Right-handed speed handle assemblies that are connected to the standard milling machine mounting apparatuses typically include a reciprocally movable pin operatively connected to a handle forming part of the assembly. The handle assembly is maintained to the pinion shaft by a set screw that loosely engages a groove formed in a sleeve member connected to the right end of the pinion shaft. The engagement between the screw and the groove enables the handle to be rotated relative to the pinion shaft while remaining connected to it. The pin under the control of the handle engages a selected one of a plurality of bores formed on an end of the sleeve member, thereby locking the handle to the pinion shaft to prevent relative rotation when the handle member is in the engagement position. An example of a "speed handle" is shown in U.S. Pat. No. 5,267,484 to Cukelj, which is incorporated herein by reference in its entirety. This type of handle enables an operator to disengage the pin from the bores of the sleeve member and rotate the handle relative to the pinion shaft to a desired position where maximum mechanical leverage can be obtained by the operator for the particular machining operation.

SUMMARY OF THE INVENTION

The present invention is directed to an apparatus for adapting a vertical knee-type milling machine to accommodate a left-handed handle assembly whereby left-handed operation of the machine is facilitated. The apparatus of the invention may be supplied as individual components that are utilized with some standard milling machine components including parts from the milling machine such as the clutch sleeve, locknut, spring and trip lever. In the preferred embodiment, however, the invention is supplied as a kit including all clutch components (if the machine is so equipped) so that the invention is easily installed onto the machine because disassembly of at least some machine components unrelated to the invention (such as the overload clutch) is not required. By using the kit of the present invention, a handle assembly (a fixed handle, a speed handle, etc.) can quickly and easily be mounted onto the left end of the pinion shaft to expedite left hand operation of the machine. In fact with the present invention, a handle can be mounted on both sides of the machine, so that two handed operation is possible.

In the illustrated embodiment, a handle is shown as the type of handle attached to the machine. To facilitate the explanation, the invention will be described in connection with a speed handle. The invention, however, is adaptable to other types of handles including a standard fixed handle of the type that is usually supplied with the machine, and the present invention should not be limited to a speed handle.

In its broad aspects, the present invention is directed to an apparatus including an elongated rotational member having a shaft portion at one end and a sleeve portion at the other end that receives a left end portion of the pinion shaft. The pinion shaft and the rotational member are connected to prevent relative rotation therebetween. A clutch device is provided for moving the rotational member in an axial direction of the pinion shaft and engaging the rotational member with a driven gear of the milling machine to rotate the pinion shaft. An engagement device is connected to the rotational member for selectively engaging the rotational member with a handle assembly such that a milling machine operator can rotate the pinion shaft, from the left side of the machine, using his left hand on a handle of the handle assembly.

More specifically, the clutch device includes a clutch sleeve disposed around the sleeve portion of the rotational member to permit relative movement between the rotational member and the clutch sleeve in the axial direction. A locknut is connected to the rotational member. A spring is provided for biasing the clutch sleeve away from the locknut in the axial direction. A trip lever moves the clutch sleeve in the axial direction to engage the clutch sleeve with the driven gear. A bearing ring is mounted on a central axial portion of the rotational member, the trip lever being connected to the bearing ring.

A cover is disposed around the rotational member, which includes a main body portion and a cap connected to the main body portion. The main body portion and the cap each have an opening extending in the axial direction. A device is used to fasten the engagement device to the cap. Another device is disposed in the cover for adjusting the range of motion of the trip lever.

The engagement device includes a sleeve that receives and locks an end of the shaft portion therein and is rotatably connected to the cover. The sleeve includes an engagement portion including a circular base portion with circumferentially spaced openings disposed therein and a cylindrical collar member extending from the base portion in the axial direction and having a groove formed around its circumference.

A method of adapting a vertical knee-type milling machine to accommodate a left-handed handle assembly according to the invention includes the step of removing the clutch arm cover from the milling machine housing. The elongated rotational member is provided having a shaft portion at one end and a sleeve portion at the other end. The clutch sleeve is connected to the sleeve portion of the rotational member. The spring is provided on the rotational member for biasing the clutch sleeve toward the driven gear.

The method also includes the step of providing the cover around the rotational member. The engagement sleeve is mounted onto the end wall of the cover for operative rotation on the cover. The shaft portion of the rotational member is connected to the engagement sleeve such that the rotational member can be moved in the axial direction but not rotated with respect to the engagement sleeve. The left end portion of the pinion shaft and the sleeve portion of the rotational member are connected to prevent relative rotation therebetween. Adaptation of the milling machine is completed by mounting the cover to the milling machine housing.

The left-handed feed handle kit of the present invention is advantageously completely assembled by the manufacturer and provides a simple way to modify a vertical knee-type milling machine to accommodate a handle assembly on the left side of the machine. To install the kit, the milling machine operator merely removes the existing clutch arm cover from the milling machine housing adjacent the left end portion of the pinion shaft. An overload clutch sleeve and associated components is replaced with components of the kit that are constructed in accordance with the invention and which includes a handle engagement device or hub sleeve. The cover preferably supplied in the kit, is then mounted to the milling machine housing by inserting fasteners into the existing tapped holes of the milling machine housing. The operator can then mount a conventional handle assembly to the hub sleeve, now located on the left side of the machine, enabling left-handed operation of the machine.

Additional features of the invention will become apparent and a fuller understanding obtained by reading the following detailed description made in connection with the accompanying drawings.

DETAILED DESCRIPTION OF PREFERRED EMBODIMENTS

Figure 1:
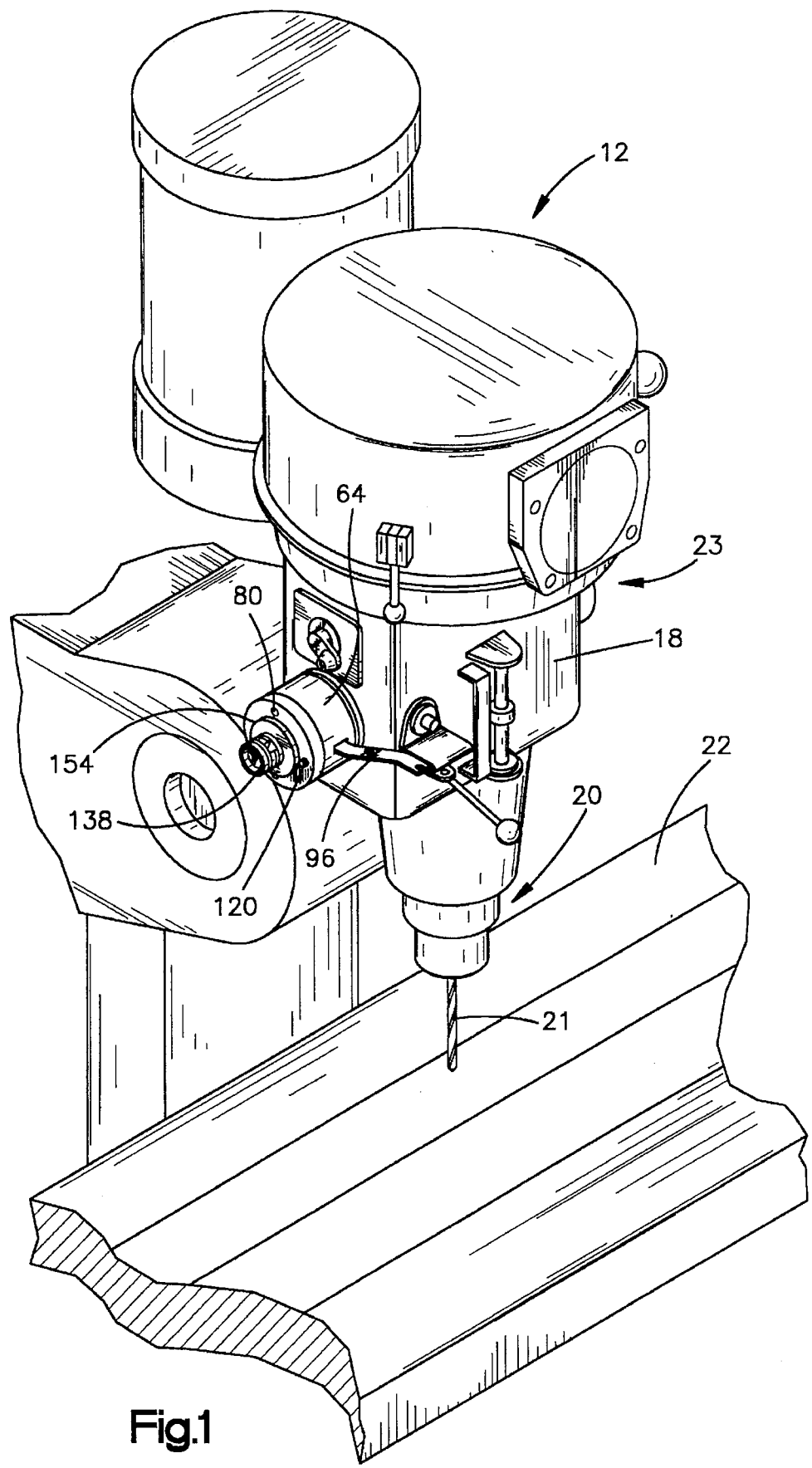
FIG. 1 is a perspective view of a vertical knee-type milling machine including an apparatus for adapting a milling machine to accommodate a left-handed handle constructed in accordance with the invention.
Figure 2:
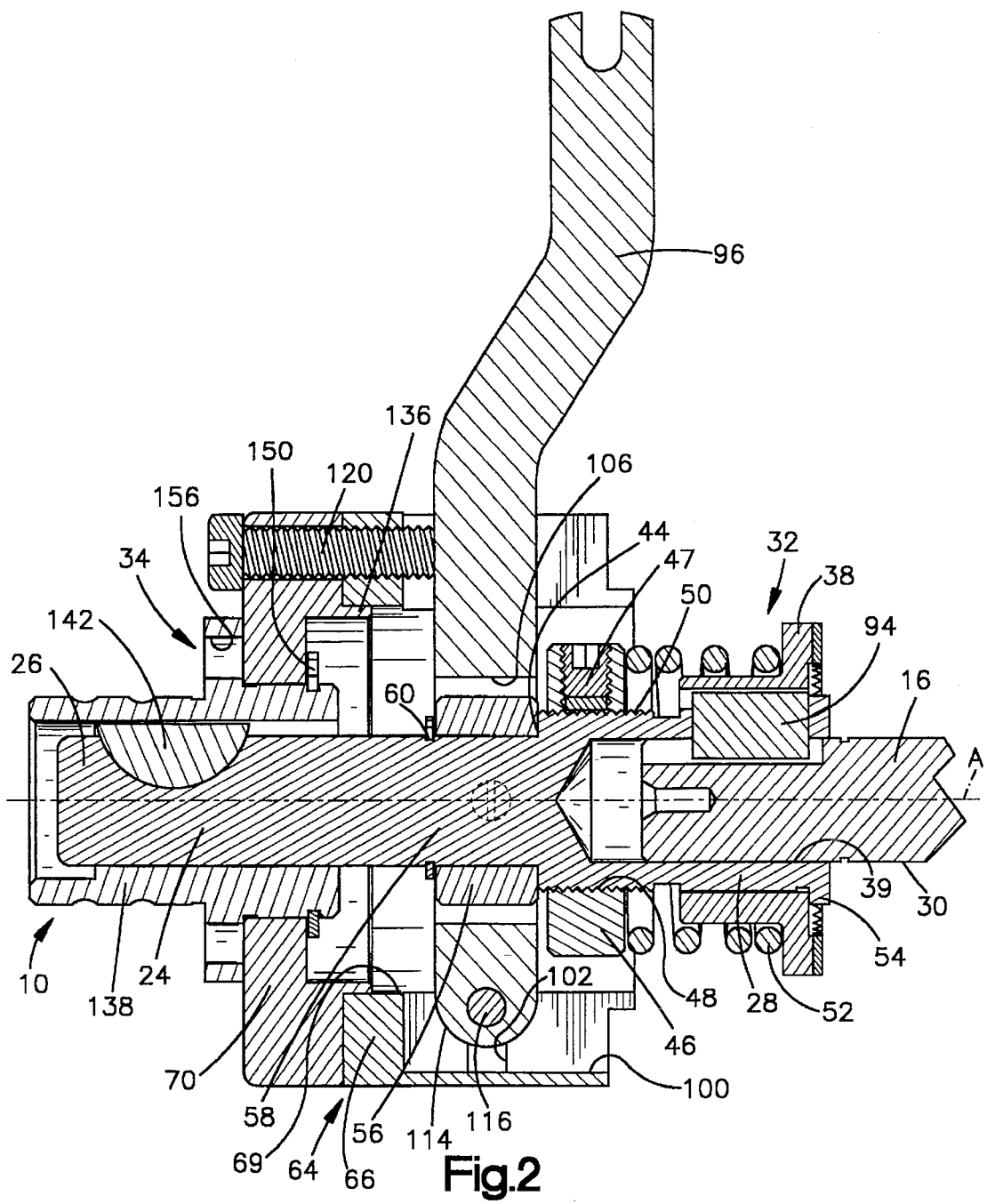
FIG. 2 is a vertical cross-sectional view of the apparatus of the invention.

Turning now to the drawings, and to FIGS. 1 and 2 in particular, an apparatus or kit 10 is shown for adapting a milling machine 12 to accommodate an operating or quill handle, such as a speed handle (not shown), on the left side of the machine. The milling machine 12 shown in FIG. 1 is a vertical knee-type milling machine. The milling machine 12 includes a pinion shaft 16 that can be rotated manually by the speed handle assembly. Alternatively, the pinion shaft can be rotated by a gear (not shown) that is driven by a transmission (also not shown) in the housing 18 of the milling machine. In either case, rotation of the pinion 16 moves a quill 20 and a tool 21 that it grips, towards and away from a workpiece table 22. A right-handed feed handle assembly 23 is mounted to the right end portion of the pinion shaft 16.

The apparatus 10 includes an elongated rotational member 24 having a shaft portion 26 at one end and a sleeve portion 28 at the other end that has a bore 29 extending in an axial direction A of the pinion shaft 16. In the illustrated assembly the rotational member may be referred to as an overload clutch sleeve. The bore 29 receives the left end portion 30 of the pinion shaft 16. The pinion shaft 16 and the rotational member 24 are connected together to prevent relative rotation therebetween using a key 94. A clutch device 32 carried by the overload clutch sleeve 24 is engageable with a driven gear (not shown). A overload clutch trip lever to be described is used to move the rotational member 24 in the axial direction A of the pinion shaft 16 to engage the clutch 32 with the driven gear and rotate the pinion shaft 16. An engagement device or pinion shaft hub sleeve 34 provides a means for mounting an operating or what is sometimes referred to as a quill handle (such as speed handle) to the left side of the machine.

The clutch device 32 includes an overload clutch 38 disposed around the sleeve portion 28 of the rotational member 24 to permit relative movement between the rotational member 24 and the clutch 38 in the axial direction A. The clutch 38 has a hole 39 that extends through it. A geared portion 40 of the clutch 38 has teeth 42 disposed around the hole 39, which are configured to mesh with teeth of the driven gear.

The rotational member 24 has a greater diameter at the sleeve portion 28 than at the shaft portion 26, forming a shoulder 44. A locknut 46 is interiorly threaded at 48 to external threads 50 provided on the rotational member 24. The locknut 46 is secured in place in the axial direction A on the rotational member 24 by a set screw 47 disposed in a hole 49 of the locknut 46. The set screw 47 exerts a force on a plug 51 also disposed in the hole 49 against the rotational member 24. A spring 52 is disposed around the rotational member 24 and normally biases the overload clutch 38 away from the locknut 46 in the axial direction A. The sleeve portion 28 of the rotational member 24 is fabricated with an annular flange 54 at one end, which limits movement of the clutch 38 in the axial direction A away from the locknut 46.

The clutch device 32 also includes a bearing ring 56 preferably made of bronze or other bearing-type material, mounted on a central axial portion 58 of the rotational member 24. An annular groove 60 is axially spaced from the shoulder 44 and a retaining ring 62 is snapped into the groove 60 to keep the bearing ring 56 in place on the rotational member 24 between the retaining ring 62 and the shoulder 44.

A cover 64 is disposed around the rotational member 24. The cover 64 includes a hollow cylindrical main body 66, which has a circular opening 69 through it in the axial direction A, and a cylindrical cap 70 connected to the main body 66. The main body 66 includes a first end portion 72 having a flat face 74, and a second opposing end portion 76 having an annular lip 78 protruding therefrom. The annular lip 78 of the main body 66 is provided to facilitate seating the main body 66 in an opening of the milling machine housing 18.

The cap 70 is connected to the main body 66, and the cap 70 and the main body 60 are both connected to the milling machine housing 18, by two socket head cap screws 80. Each of these screws 80 extends through a bore 82 in the cap 70 and a bore 84 in the main body 66, and each has a threaded portion that is threaded into a tapped bore (not shown) of the milling machine housing 18.

A rectangular keyway 88 is provided in the sleeve portion 28 of the rotational member 24 and a rectangular keyway 90 is provided in the clutch 38. A rectangular keyway 92 is provided on the end 30 of the pinion shaft 16. A rectangular key 94 is disposed in the keyways 88, 90, and 92 to prevent relative rotational movement between the clutch 38 and the rotation 24, and between the pinion shaft 16 and the rotational member 24.

A trip lever 96 is connected to the bearing ring 56 for moving the clutch 38 in the axial direction A to engage the clutch 38 with the driven gear. To accommodate the trip lever 96, the main body 66 has an opening 98 extending from the second end portion 76 in the axial direction A. On a circumferentially opposite portion of the main body 66, a first opening 100 extends in the axial direction A from the second end portion 76 of the main body 66. The first opening 100 is intersected by a second opening 102 extending perpendicular to the first opening 100 at approximately the same depth in the main body 66 as the first opening 100.

Figure 3:
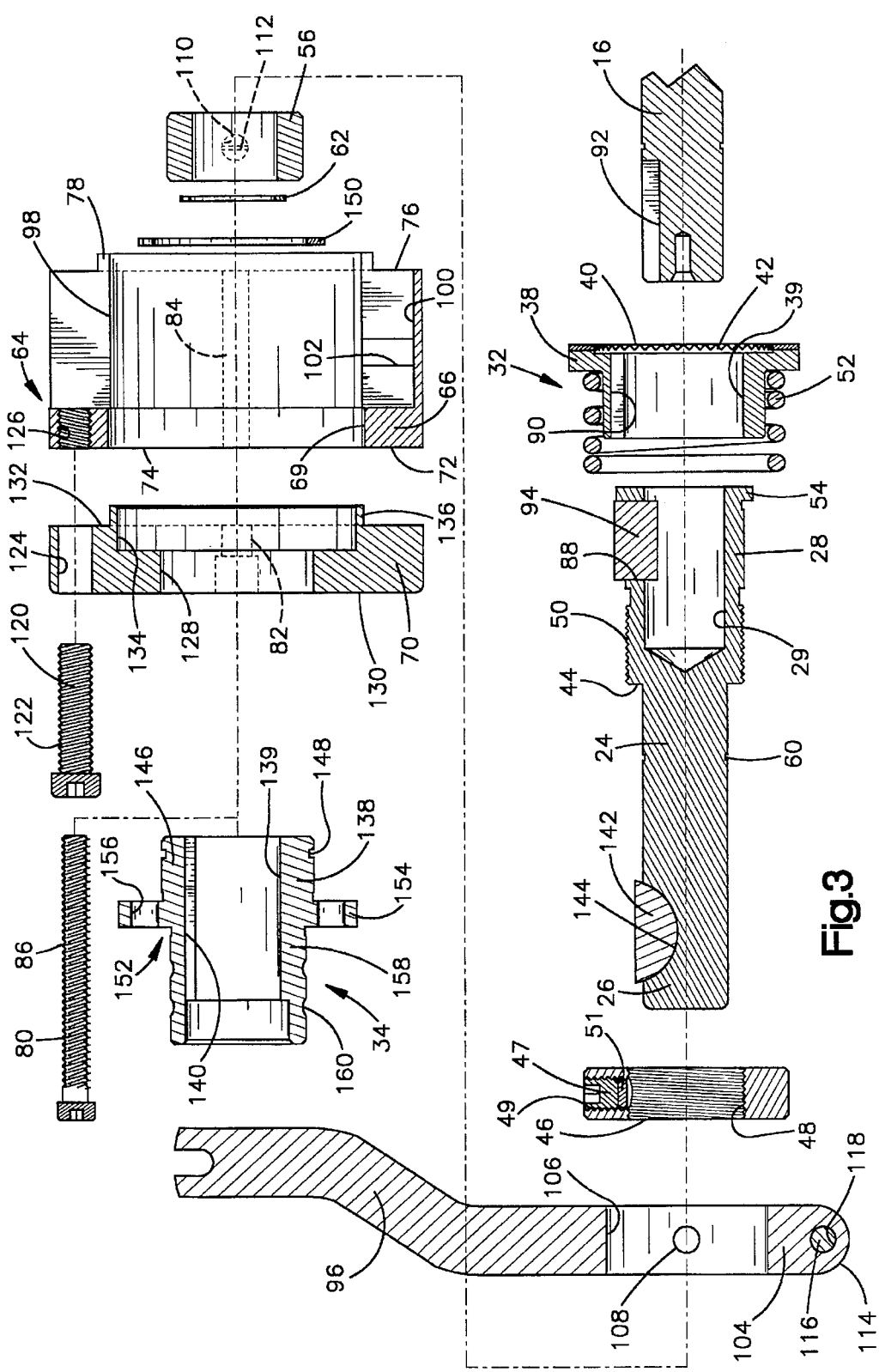
FIG. 3 is an exploded vertical cross-sectional view of the apparatus shown in FIG. 2.

The trip lever 96 has an end portion 104 configured to define a circular opening 106. The trip lever 96 is connected to the bearing ring 56 so that the bearing ring 56 is located within the opening 106. Two aligned bores 108 (only one of which is shown in FIG. 3) are provided in the lever 96. These bores 108 correspond to and are aligned with two tapped bores 110 in the bearing ring 56 (only one of which is shown in FIG. 3). Two pins 112 with a threaded end portion are each disposed in one of the bores 108 in the lever 96 and threaded into one of the bores 110 in the bearing ring 56.

The lever 96 has a rounded portion 114 at the end portion 104, which is spaced from the opening 106. A pin 116 is disposed in a hole 118 transverse to the rounded portion 114. The rounded portion 114 fits into the first opening 100 in the main body 66 and the pin 116 fits into the second opening 102 of the main body 66. The first opening 100 extends beyond the second opening 102 toward the first end portion 72 of the main body 66 by a distance sufficient to permit movement of the rounded portion 114 when the lever 96 is moved.

Because the pin 116 is spaced slightly upward from the end of the rounded portion 114 and the second opening 102 follows the cylindrical contour of the main body 60, when the pin 116 engages the main body 66 the rounded portion 114 can be moved within the first opening 100. As a result, the lever 96 can be rocked about the pin 116 to move the rotational member 24 in the axial direction A.

By moving the lever 96 in the axial direction A toward the right side of the milling machine 12 (as viewed in FIG. 1), the rotational member 24, and hence the overload clutch 38, are moved in that direction. This engages the clutch 38 with the driven gear, which rotates the pinion shaft 16 to vertically move the quill 20. The gear is continuously driven by a transmission (not shown). In an overload condition, meshing of the geared face 40 of the clutch 38 and the driven gear is facilitated by the force of the spring 52 biasing the clutch 38 toward the driven gear.

A set screw 120 with threads 122 is disposed in a bore 124 through the cap 70 and into a tapped hole 126 in the main body 66 for adjusting the range of motion of the trip lever 96 in the opening 98 of the main body 66. By rotating the set screw 120 clockwise to advance it into the opening 98, the range of motion of the lever 96 is reduced. Conversely, by rotating the set screw 120 counterclockwise to retract it from the opening 98, the range of motion of the lever 96 is increased.

The cap 70 has a circular opening 128 extending therethrough in the axial direction A. The cap 70 has a first end portion 130 and a second end portion 132 with a circular recess disposed around the opening 128. An annular lip 136 extends around the recess 134 for fitting the cap 70 into the opening 69 of the main body 66.

The engagement apparatus 34 includes a hub sleeve 138 that receives and locks an end of the shaft portion 26 of the rotatable member 24 therein. The hub sleeve 138 has an opening 139 extending through it, and is rotatably connected to the first end portion 130 of the cap 70 around the opening 128. The hub sleeve 138 has a rectangular keyway 140 formed therein that receives a portion of a semicircular woodruff key 142 disposed in a semicircular opening 144 in the shaft portion 26, when the shaft 26 is inserted into the opening 139. The key 142 prevents relative rotation between the rotational member 24 and the hub sleeve 138, and yet permits axial movement therebetween. In particular, the lever 96 can move the shaft portion 26 axially in the opening 139 to engage the clutch 38 with the driven gear.

The hub sleeve 138 has an end portion 146 that extends through the cap opening 128. The end portion 146 has an annular groove 148 that receives a retaining ring 150. The retaining ring 150 prevents movement of the hub sleeve 138 in the axial direction A away from the driven gear.

The hub sleeve 138 has an engagement region 152 including a circular base portion 154 with a plurality of circumferentially spaced openings 156 disposed therein extending in the axial direction A. The base portion 154 prevents movement of the hub sleeve 138 in the axial direction A toward the driven gear. A cylindrical collar portion 158 extends from the base portion 154 in the axial direction A and has at least one groove 160 formed around its circumference.

The feed handle kit 10 of the present invention may be assembled by locating the clutch sleeve 38 on the sleeve portion 28 of the rotational member 24. The spring 52 is placed around a hub portion of the overload clutch 38 and the sleeve portion of the rotational member 24 and compressed by threading the locknut 46 onto the threaded portion 50 toward the annular flange 54. The locknut 46 is secured in place in the axial direction A by screwing set screw 47 against the plug 49, which in turn engages the rotational member 24. Compressing the spring 52 exerts a force biasing the clutch 38 toward the annular flange 54 of the rotational member 24. Thus, the clutch 38 normally contacts the annular flange 54. The keyway 88 of the sleeve portion 28 and the keyway 90 of the clutch 38 are aligned with each other and the key 94 is inserted into them so as to protrude into the sleeve portion bore 29. The left end portion of the pinion shaft 16 is inserted into the clutch sleeve opening 39 and the sleeve portion bore 29 to engage the key 94 in the keyway 92 of the pinion shaft 16.

The bearing ring 56 is placed onto the rotational member 24 against the shoulder 44 and axially secured in place with the retaining ring 62. The lever 96 is placed around the bearing ring 62, so that the bearing ring 62 is located in the opening 106, and the lever 96 is connected to the bearing ring 62 by the pins 112.

The rotational member 24 is inserted into the main body 66 so that the shaft portion 26 extends from the first end portion 72 and the sleeve portion 28 extends from the second end portion 76. The rounded portion 114 of the lever 96 and the pin 116 are inserted into the first and second openings 100, 102 of the main body 66.

The hub sleeve 138 is mounted to the cap 70 by inserting its end portion 146 into the cap opening 128 and snapping the retaining ring 150 into the annular groove 148. The shaft portion 26 of the rotational member 24 is inserted into the opening 139 of the hub sleeve 138 and locked to the hub sleeve 138 to prevent relative rotation by sliding the key 142 on the end of the shaft portion 26 into the keyway 140 of the hub sleeve 138.

The cap 70 is mounted to the main body 66, and both the cap 70 and the main body 66 are mounted to the milling machine housing 18, by inserting the two screws 80 into the bores 82, 84 of the cap 70 and the main body 66 and by threading the screws 80 into the two tapped bores of the housing 18. The set screw 120 is threaded in place to adjust the travel of the lever 96 as desired.

The feed handle kit 10 of the invention is preferably completely assembled by the manufacturer. To adapt the milling machine 12 to use a quill handle assembly at the left end portion 30 of the pinion shaft 16, the milling machine operator removes the clutch arm cover from the housing 18 adjacent the left end portion of the pinion shaft 16. Then, the operator slides the bore 29 of the sleeve portion 28 onto the pinion shaft 16, and mounts the cover 64 to the milling machine housing 18 by screwing the two screws 80 into the threaded bores (not shown) of the milling machine housing 18.

A quill-feed speed handle assembly is connected to the engagement portion 152 of the hub sleeve 138. The speed handle assembly used is preferably that disclosed in U.S. Pat. No. 5,267,484 to Cukelj. The set screw of the speed handle assembly engages one of the grooves 160 and the two pins of the assembly engage two of the spaced openings 156 of the base portion 154.

With his left hand on a handle of the speed handle assembly, the operator can manually rotate the rotatable member 24, and hence the pinion shaft 16, which moves the quill 20 and its tool 21 either toward or away from the workpiece table 22. Moreover, to obtain leverage, for example, the operator can disengage the pins from the spaced openings 156 of the base portion 154 and rotate the handle with his left hand to a different rotational position with respect to the rotational member 24. The operator can then reengage the pins into two of the openings 156 and manually rotate the pinion shaft 16 to vertically move the quill 20.

Although preferred embodiments of the invention have been shown and described, it should be understood that various modifications and rearrangements of the parts may be resorted to without departing from the scope of the invention as disclosed and claimed herein.

What is claimed is:

1. An apparatus for adapting a vertical knee-type milling machine to accommodate a left-handed handle assembly, the milling machine having a pinion shaft with a handle assembly connectable only to a right end portion of the pinion shaft, comprising an elongated rotational member having a shaft portion at one end and a sleeve portion at the other end that receives a left end portion of the pinion shaft, the pinion shaft and said rotational member being connected to prevent relative rotation therebetween, clutch means for moving said rotational member in an axial direction of the pinion shaft and engaging said rotational member with a driven gear of the milling machine to rotate the pinion shaft, and engagement means connected to said rotational member for selectively engaging said rotational member with a handle assembly such that a milling machine operator can rotate the pinion shaft using his left hand on a handle of the handle assembly.

2. The apparatus of claim 1 wherein said clutch means comprises a clutch sleeve disposed around said sleeve portion of said rotational member to permit relative movement between said rotational member and said clutch sleeve in the axial direction, a locknut connected to said rotational member, a spring for biasing the clutch sleeve away from the locknut in the axial direction, and a trip lever for moving the clutch sleeve in the axial direction to engage the clutch sleeve with the driven gear.

3. The apparatus of claim 2 further comprising a bearing ring mounted on a central axial portion of said rotational member, said trip lever being connected to said bearing ring.

4. The apparatus of claim 1 wherein the handle is a speed handle.

5. The apparatus of claim 1 further comprising a cover disposed around said rotational member.

6. The apparatus of claim 5 wherein said cover includes a main body portion and a cap connected to said main body portion, said main body portion and said cap each having an opening extending in the axial direction.

7. The apparatus of claim 5 further comprising means disposed in said cover for adjusting the range of motion of the trip lever.

8. The apparatus of claim 5 wherein said engagement means includes a sleeve that receives and locks an end of said shaft portion therein and is rotatably connected to said cover, said sleeve having an engagement portion including a circular base portion with circumferentially spaced openings disposed therein in the axial direction and a cylindrical collar member extending from the base portion in the axial direction and having a groove formed around its circumference.

9. The apparatus of claim 8 wherein said cover includes a main body portion and a cap connected to said main body portion, said main body portion and said cap each having an opening extending in the axial direction, further including means for connecting said engagement means to said cap.

10. An apparatus for adapting a vertical knee-type milling machine to accommodate a left-handed handle assembly, the milling machine having a pinion shaft with a handle assembly connectable only to a right end portion of the pinion shaft, comprising:

an elongated rotational member having a shaft portion at one end and a sleeve portion at the other end receiving a left end portion of the pinion shaft, the pinion shaft and said rotational member being connected to prevent relative rotation therebetween;

a cover disposed around said elongated member;

a clutch apparatus comprising a clutch sleeve disposed around said sleeve portion of said rotational member to permit relative movement between said rotational member and said clutch sleeve in the axial direction, a locknut connected to said rotational member, a spring for biasing said clutch sleeve away from the locknut in the axial direction, a bearing ring mounted on a central axial portion of said rotational member, and a trip lever connected to said bearing ring for moving the clutch sleeve in the axial direction to engage the clutch sleeve with a driven gear of the milling machine to rotate the pinion shaft; and an engagement sleeve for engaging a handle assembly, wherein said engagement sleeve receives and locks an end of said shaft portion therein and is rotatably connected to said cover, and includes a circular base portion with circumferentially spaced openings disposed therein and a cylindrical collar member extending from the base portion in the axial direction and having a groove formed around its circumference;

whereby a milling machine operator can rotate the pinion shaft using his left hand on a handle of the handle assembly.

11. The apparatus of claim 10 wherein said cover includes a main body portion and a cap connected to said main body portion, said main body portion and said cap each having an opening extending in the axial direction.

12. The apparatus of claim 11 wherein said sleeve is connected to said cap.

13. In a vertical knee-type milling machine including a housing, a pinion shaft disposed in the housing that can either be rotated manually or rotated by a driven gear for moving a quill towards and away from a workpiece table, a right-handed handle assembly connected to a right end portion of the pinion shaft, and a clutch arm cover mounted to the housing adjacent the left end portion of the pinion shaft, the improvement comprising a kit for adapting the milling machine to accommodate a left-handed handle assembly, comprising an elongated rotational member having a shaft portion at one end and a sleeve portion at the other end receiving the left end portion of the pinion shaft, the pinion shaft and said rotational member being connected to prevent relative rotation therebetween;

a cover disposed around said elongated member and mounted to the housing in place of the clutch arm cover;

clutch means for moving said rotational member in an axial direction of the pinion shaft and engaging said rotational member with the driven gear of the milling machine to rotate the pinion shaft, and engagement means connected to said rotational member for selectively engaging said rotational member with a handle assembly such that a milling machine operator can rotate the pinion shaft using his left hand on a handle of the handle assembly.

14. The improvement of claim 13 wherein said cover includes a main body portion and a cap portion connected to said main body portion, said main body portion and said cap each having an opening extending in the axial direction.

15. The improvement of claim 14 wherein said engagement means is rotatably mounted to said cap.

16. The improvement of claim 14 further comprising an opening in said main body that receives the trip lever.

17. The improvement of claim 16 further comprising means disposed in said cover for adjusting the range of motion of the trip lever.

18. The improvement of claim 13 further comprising a bearing ring mounted around a central axial portion of said rotational member, the trip lever being connected to said bearing ring.

19. The apparatus of claim 13 wherein said clutch means comprises a clutch sleeve disposed around said sleeve portion of said rotational member to permit relative movement between said rotational member and said clutch sleeve in the axial direction, a locknut connected to said rotational member, a spring for biasing the clutch sleeve away from the locknut in the axial direction, and a trip lever for moving the clutch sleeve in the axial direction to engage the clutch sleeve with the driven gear.

20. The apparatus of claim 13 wherein said engagement means includes a sleeve that receives and locks an end of said shaft portion therein and is rotatably connected to said cover, said sleeve having an engagement portion including a circular base portion with circumferentially spaced openings disposed therein and a cylindrical collar member extending from the base portion in the axial direction and having a groove formed around its circumference.

21. A method of adapting a vertical knee-type milling machine to accommodate a left-handed handle assembly, the milling machine having a pinion shaft disposed in a housing that can either be rotated manually or rotated by a driven gear for moving a quill towards and away from a workpiece table, wherein a right-handed handle assembly is connected to a right end portion of the pinion shaft and a clutch arm cover is mounted to the housing adjacent the left end portion of the pinion shaft, comprising the steps of removing the clutch arm cover from the milling machine housing, providing an elongated rotational member having a shaft portion at one end and a sleeve portion at the other end, connecting a clutch device to said rotational member for engaging the driven gear, providing a cover around said rotational member having an end wall and an opening extending in the axial direction, mounting an engagement sleeve onto the end wall of said cover, connecting the shaft portion of said rotational member to said engagement sleeve such that said rotational member can be moved in the axial direction but not rotated with respect to said engagement sleeve, connecting the left end portion of the pinion shaft and the sleeve portion of said rotational member to prevent relative rotation therebetween, and mounting said cover to the milling machine housing.

22. An apparatus for adapting a vertical knee-type milling machine to accommodate an operating on the left side of the machine to facilitate left-handed operation, the milling machine having a pinion shaft with a handle assembly connectable to a right end portion of the pinion shaft, comprising an elongated rotational member having a shaft portion at one end and a sleeve portion at the other end that receives a left end portion of the pinion shaft, the pinion shaft and said rotational member being coupled to prevent relative rotation therebetween;

a hub sleeve connected to said rotational member for engaging said rotational member with an operating handle such that a milling machine operator can rotate the pinion shaft using his left hand to operate the handle; and, a housing member enclosing at least a portion of said rotational member and by which the operative position of said rotational member with respect to the pinion shaft is maintained.

23. The apparatus of claim 22 further comprising clutch means for moving said rotational member in an axial direction of the pinion shaft and engaging a clutch member with a driven gear of the milling machine to rotate the pinion shaft.

* * * * *